(No Model.)
M. G. FARMER.
REGULATOR FOR DYNAMO ELECTRIC MACHINES.
No. 320,234. Patented June 16, 1885.
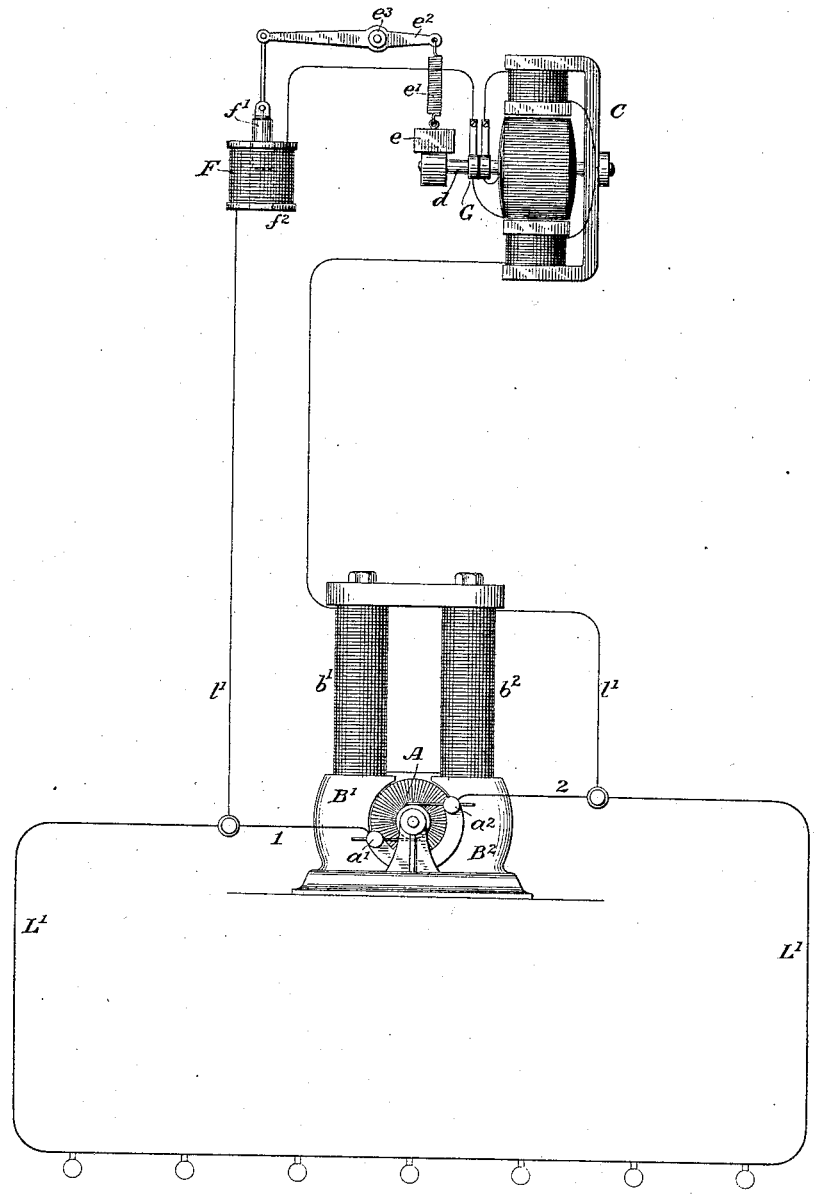
Witnesses
Geo. W. Breck.
Carrie E. Ashley.
Inventor
Moses G. Farmer,
By his Attorneys
Pope & Edgecomb

UNITED STATES PATENT OFFICE.

MOSES G. FARMER, OF NEW YORK, N. Y.

REGULATOR FOR DYNAMO-ELECTRIC MACHINES.

SPECIFICATION forming part of Letters Patent No. 320,234, dated June 16, 1885.

Application filed October 14, 1884. (No model.)

*To all whom it may concern:*

Be it known that I, MOSES G. FARMER, a citizen of the United States, residing in New York, in the county and State of New York, have invented certain new and useful Improvements in Regulators for Dynamo-Electric Machines, of which the following is a specification.

My invention relates to the class of apparatus employed for regulating the strength of the currents derived from dynamo-electric generators.

The object of the invention is to provide convenient and efficient means for automatically causing the current which traverses the circuit including the field-magnets of a dynamo-electric machine to remain approximately constant.

The invention consists in organizing apparatus in substantially the following manner: Connected in circuit with the field-magnets of a dynamo-electric generator is an electric motor of any convenient construction organized to be actuated by the current employed for intensifying the field of force. A brake is applied to this motor, and the amount of retardation which it exerts upon the same is dependent upon the action of electro-magnetic device, which in turn is controlled by the current traversing the field-of-force circuit of the generator. For this purpose the coils of an electro-magnet are included in the field-of-force circuit, and as the strength of the current traversing this circuit increases, the pressure of the brake is relieved to a corresponding degree, and the motor is permitted to revolve with greater rapidity. When the current in the field-circuit is diminished, the pressure of the brake is increased, and thus the counter electro-motive force produced by the motor is decreased.

It is well understood that any change in the conditions of the work-circuit of a generator which causes an increase in the strength of the current traversing the coils of the field-magnets serves to intensify the field of force. It is also well known that an electric motor when in operation establishes what is termed a "counter-current"—that is to say, a force opposing that by which the motor is being actuated. It is this counter-current which is increased in value as the strength of the current traversing the field-of-force magnet is increased that I avail myself of for neutralizing to a proportionate degree the effects of the current traversing the field-magnet circuit. It will be evident that the increase in current will not only tend to impel the motor with greater rapidity, and thereby increase the counter-current, but it will also relieve the motor from the pressure of the brake, and thereby introduce a second factor tending to increase the rate of movement of the motor, and thus add to the value of the counter-current.

It has heretofore been proposed to regulate the generative capacity of a dynamo-electric generator by a variable counter electro-motive force introduced in the field-magnet circuit, and it has also been proposed to produce such counter electro-motive force by means of an electromotor the rate of revolution of which is controlled by means of an electro-magnet arranged in the work-circuit in multiple arc with other translating devices. It has further been proposed to locate a magnet for modifying the movement of the motor in a conductor leading to both the work and the field circuit. The function of this magnet is to offer increased resistance to the rotation of the motor upon a decrease in the resistance of the work-circuit, and vice versa. By placing the brake-magnet in the field-magnet circuit alone and organizing it to modify the motion of the motor upon an increase in the current caused to traverse that circuit, not only are all the advantages incident to the other organizations gained, but, in addition, the modification produced by the motor in the current in the field-magnet circuit, which immediately results upon a tendency toward an increase of that current, is felt by the brake-magnet at once, and its regulating function set in operation without the consumption of the time required to modify the magnetism of the field-magnets, and through them that of the armature, and thus of the current generated.

The accompanying drawing is a diagram illustrating an organization of apparatus adapted to carry out my invention.

Referring to the drawing, A represents the armature of a dynamo-electric machine, and B' and B² its field-magnets. A conductor, 1, leads from one commutator-brush, a', of the generator to a conductor, L', constituting the work-circuit of the generator. A conductor, 2, leads from the other terminal of the conductor L' to the second commutator-brush, a². The coils b' and b² of the field-magnets are included in a conductor, 1' 1', leading from one of the conductors, 1, to the other conductor, 2, in the usual manner.

The operation of the dynamo-electric machine as thus far described is well understood, and requires no further explanation.

Included in the conductor 1' 1' is an electric motor, C. This motor is preferably constructed with its field-magnet coils and its armature-coils included in the same circuit through the segments of a commutator, G, the organization being similar to any of the well-known forms of motors and commutators. The shaft d of the motor C is provided with a brake, e, which is carried upon a yielding connection, e', extending from a lever, e². The lever e² is pivoted at its center, as shown at e³, and at the end opposite the attachment of the spring it is coupled to the movable core f' of an electro-magnet, F. The spring e' is inserted between the brake and the levers carrying the same, for the purpose of communicating to the brake more gradually any movements of the core f' which may be occasioned by the action of the coil f². The coils f² of the electro-magnet F are included in the circuit of the conductor 1', and accordingly as the electro-magnet is vitalized to a greater or less extent, the pressure of the brake upon the shaft of the motor will be lessened or increased.

When the current caused to traverse the conductor 1' is increased in strength, the pressure of the brake will be relieved, and the motor will be permitted to rotate with greater rapidity. When, on the other hand, the current traversing the conductor 1' is for any reason decreased, the pressure of the brake will be increased, and the motor caused to rotate with less rapidity. The operation of the regulating device is thus to establish a greater or less counter-current in the conductor 1', accordingly as the strength of the current traversing that conductor from the dynamo-electric machine is increased or decreased. Thus if for any cause the current traversing the field-magnet is unduly increased in strength, so that the current generated by the machine would be greater than is normally desired, then the counter-current established by the motor will counteract such an increase in strength and cause the ultimate current which traverses the coils of the field-magnets to remain approximately constant.

I claim as my invention—

1. The combination, substantially as hereinbefore set forth, with a dynamo-electric generator, of an electric motor included in the circuit of the field-magnets of the same, an electro-magnet in the circuit with said field-magnets and motor, and a brake applied to said motor, the pressure of which is decreased or increased by the action of said electro-magnet, accordingly as the strength of current traversing the motor is increased or decreased.

2. The combination, substantially as hereinbefore set forth, with a dynamo-electric generator, of a motor included in circuit with the coils of the field-magnet of said generator, for establishing a counter-current in said coils, and an electro-magnetic regulator included in circuit with said coils and motor, serving to control the strength of such counter-current, substantially as described.

3. In a dynamo-electric machine, the combination, substantially as hereinbefore set forth, with the field-magnet coils and the work-circuit of an electric generator, of an electric motor included in the circuit with said field-magnet coils, a brake applied to said motor, an electro-magnet, also included in the circuit of said field-magnet coils for controlling the operation of said brake, its armature, and a yielding mechanical connection between said armature and said brake.

In testimony whereof I have hereunto subscribed my name this 13th day of September, A. D. 1884.

MOSES G. FARMER.

Witnesses:
DANL. W. EDGECOMB,
CHARLES A. TERRY.